May 5, 1970  O. C. ECKEL  3,509,964
SOUND ABSORBING ASSEMBLY WITH AN INTEGRAL CAGE
Filed Feb. 24, 1969

Inventor
Oliver C. Eckel
by Harold E. Cole
Attorney

United States Patent Office 3,509,964
Patented May 5, 1970

3,509,964
SOUND ABSORBING ASSEMBLY WITH AN
INTEGRAL CAGE
Oliver C. Eckel, P.O. Box 226,
Weston, Mass. 02138
Filed Feb. 24, 1969, Ser. No. 801,266
Int. Cl. E04b 1/84, 1/99, 5/57
U.S. Cl. 181—33         3 Claims

ABSTRACT OF THE DISCLOSURE

A sound absorbing assembly has one or more open-mesh metal cages each having an integral bottom, two oppositely disposed sides extending from the latter, each side having a tongue extending laterally into the interior of a vertical portion of a sound absorbing member.

---

The principal object of my invention is to provide an open cage for a sound absorbing member which cage is made from a single piece of inexpensive, flat material that will firmly and permanently hold sound absorbing members.

The foregoing and other objects which will appear as the nature of the invention is better understood may be accomplished by a combination and arrangement of parts such as is disclosed by the drawing. The nature of the invention is such as to render it susceptible to various changes and modifications, and, therefore, I am not to be limited to the construction disclosed by the drawing, nor to the particular arrangement described in the specification; but am entitled to all such changes therefrom as fall within the scope of my claims.

Figures 1, 2:
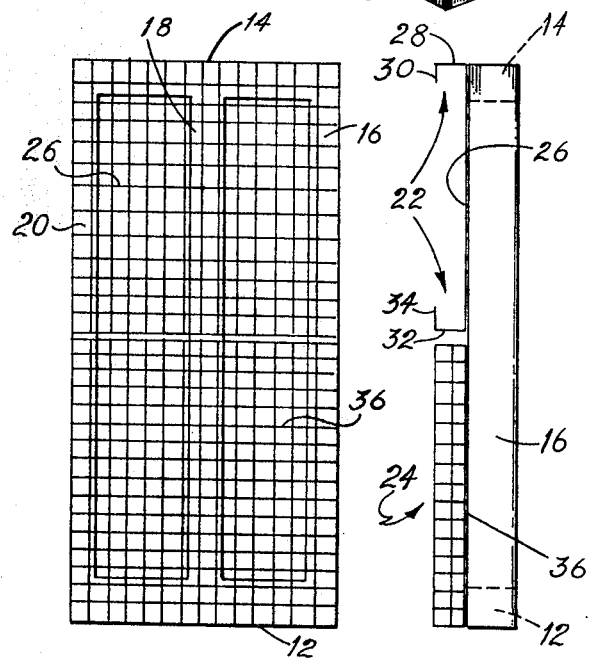
FIG. 1 is a top plan view of my assembly, the sound absorbing members being removed.
FIG. 2 is a side elevational view of the assembly shown in said FIG. 1.

As illustrated, my assembly, as shown, has a base or foundation member 10, which may be made of wood or other suitable material, having end pieces 12 and 14 and connector members 16, 18 and 20 extending between them. Said assembly has one or more sound absorbing members W, such as the partly wedge-shaped ones shown that may be made of fiber glass or other suitable material. The lower part extends vertically while the upper part is wedge-shaped as shown in said FIG. 1.

Figure 4:
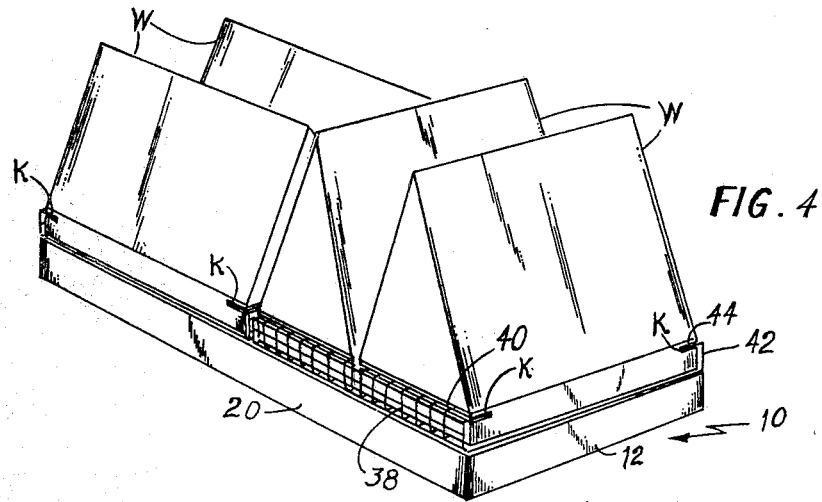
FIG. 4 is a perspective view of my complete assembly showing four sound absorbing members retained in two cages.
Figure 3:
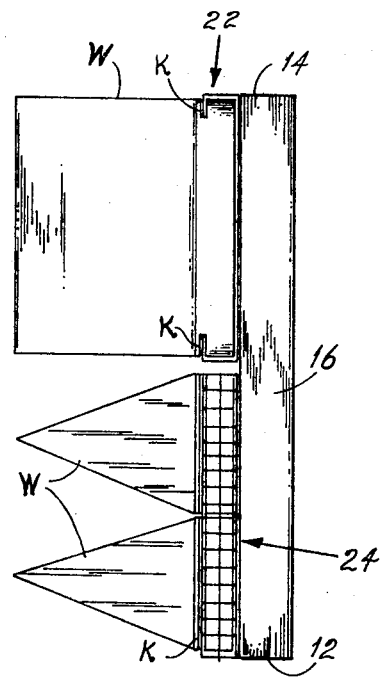
FIG. 3 is a side elevational view of my complete assembly.

I provide a cage 22, as shown, for two of said members W, and another cage 24 for two others. Said pairs of members are mounted at right angles to each other as shown in said FIGS. 3 and 4, which is common in such assemblies. No particular number of members W or cages 10 are required in the assembly.

Said cage 22 is preferably formed of a single sheet of wire mesh of firm metal having a bottom 26, a side 28 extending angularly therefrom, and a retainer tongue 30 extending inwardly from said side 28 and later referred to. Said cage 22 also has another side 32 and a retainer tongue 34 extending inwardly from the latter in a direction towards said tongue 30.

Said cage 24 is similar to cage 22, having a bottom 36, a side 38 with a tongue 40, and another side 42 with a tongue 44 extending towards said tongue 40.

Said tongues enter kerfs or slits K made in the vertical sides of said sound absorbing members W, thus firmly retaining the latter to said cages.

Said cages may be fixed to said base 10 by metal staples not shown, or by cement or otherwise, to thus tightly hold said cage bottoms 26 and 36 to said base pieces.

What I claim is:

1. A sound absorbing assembly comprising a cage and a sound absorbing member retained thereby, said cage being formed of firm mesh material having an integral bottom, two oppositely disposed sides extending angularly therefrom in the same direction, each said side having a tongue extending angularly from an adjoining portion thereof and entering into the interior of said member, said tongues extending towards each other.

2. A sound absorbing assembly as set forth in claim 1, said sound absorbing member having a lower vertically extending portion, and an upwardly wedge-shaped portion extending therefrom, said lower portion having kerfs made therein, extending from the outer surface inwardly, said tongues extending into said kerfs.

3. A sound absorbing assembly as set forth in claim 2, and another said cage, each said cage having two said sides only, and another said sound absorbing member the vertical and wedge portions of which extend at a right angle to that of the first-mentioned member, said sides of one said cage extending at a right angle to said sides of the other said cage.

References Cited

UNITED STATES PATENTS 2,980,198   4/1961   Eckel.
3,086,325   4/1963   Eckel.
3,146,498   9/1964   Eckel.

ROBERT S. WARD, JR., Primary Examiner

U.S. Cl. X.R.
52—145, 497